United States Patent
College et al.

[11] Patent Number: 6,099,816
[45] Date of Patent: *Aug. 8, 2000

[54] PROCESS FOR DESULFURIZING A SULFUR-DIOXIDE CONTAINING GAS

[75] Inventors: John W. College, Pittsburgh, Pa.; Lewis B. Benson, Louisville, Ky.

[73] Assignee: Dravo Lime, Inc., Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/687,135

[22] Filed: Jul. 24, 1996

[51] Int. Cl.$^7$ ...................................... B01D 53/50
[52] U.S. Cl. ................ 423/243.08; 423/243.09; 423/243.1
[58] Field of Search ............ 423/243.1, 243.09, 423/243.08

[56] References Cited

U.S. PATENT DOCUMENTS

| | | | |
|---|---|---|---|
| 3,826,812 | 7/1974 | Cook et al. | 423/242 |
| 3,914,378 | 10/1975 | Selmeczi | 423/242 |
| 4,294,807 | 10/1981 | Randolph | 423/242 |
| 4,297,332 | 10/1981 | Tatani et al. | 423/240 |
| 4,454,101 | 6/1984 | Garrison et al. | 423/242 |
| 4,804,523 | 2/1989 | Abrams et al. | 423/242 |
| 4,976,937 | 12/1990 | Lee et al. | 423/242 |
| 5,039,499 | 8/1991 | Stowe, Jr. | 423/242 |
| 5,084,255 | 1/1992 | College et al. | 423/242 |
| 5,213,782 | 5/1993 | Moser et al. | 423/243 |
| 5,260,045 | 11/1993 | Moser et al. | 423/243 |

FOREIGN PATENT DOCUMENTS

| | | | |
|---|---|---|---|
| 32 41 539 A1 | 5/1984 | Germany | 423/243.08 |
| 62-213842 | 9/1987 | Japan | 423/243.08 |
| 2-152520 | 6/1990 | Japan | 423/243.08 |

*Primary Examiner*—Steven P. Griffin
*Assistant Examiner*—Timothy C Vanoy
*Attorney, Agent, or Firm*—Armstrong, Westerman Hattori, McLeland & Naughton

[57] ABSTRACT

A desulfurization process using magnesium sulfites in a clear solution has the discharge from a wet scrubbing unit passed to a reaction tank. A silica-containing solid particulate material, such as sand, is added to the reaction tank and lime is added to precipitate calcium sulfite solids onto the particulate material. The resulting solids, a calcium sulfite coated, silica containing solid particulate material is readily dewatered and may be used as a cement manufacturing process.

7 Claims, 1 Drawing Sheet

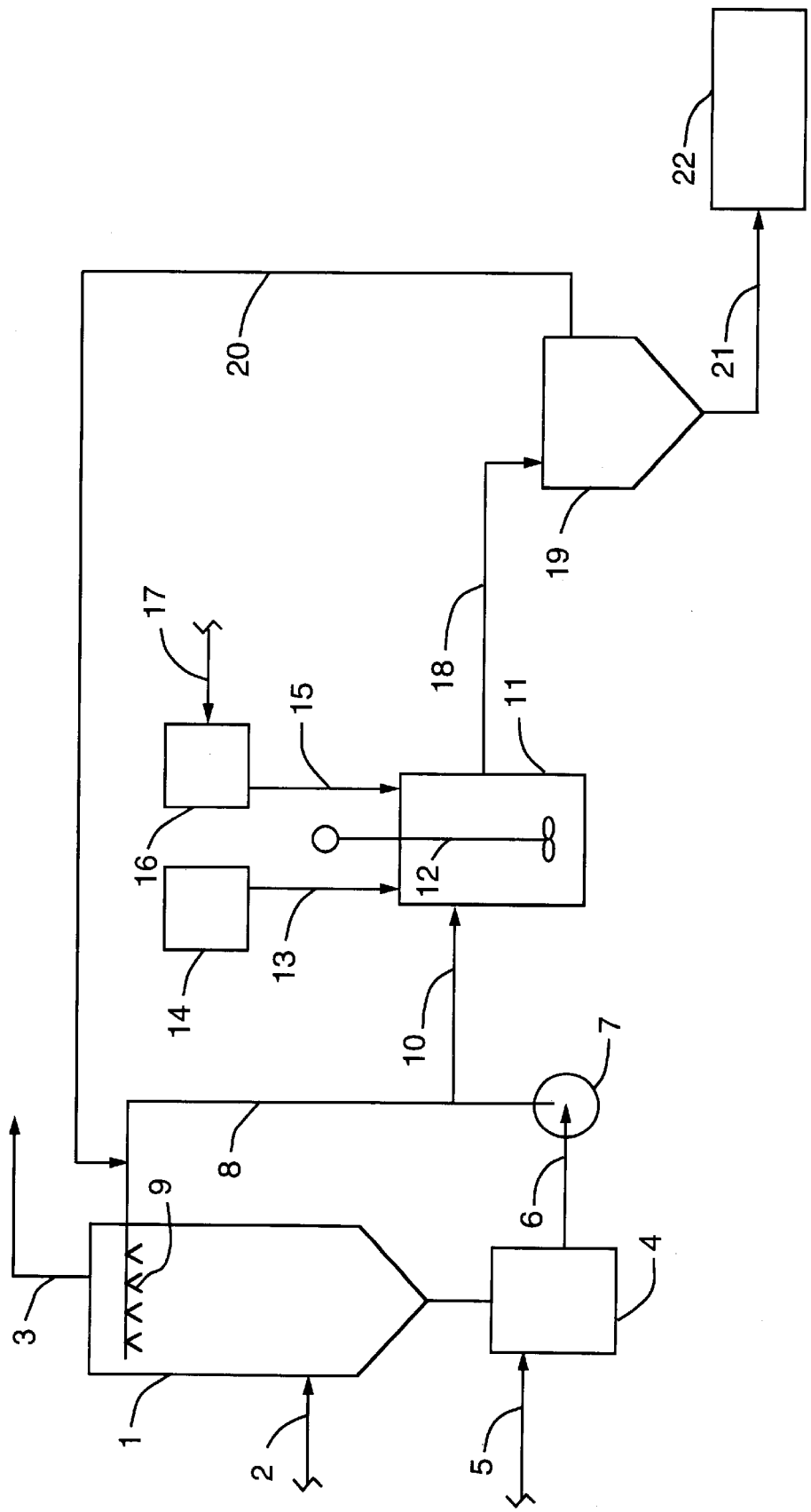

PROCESS FOR DESULFURIZING A SULFUR-DIOXIDE CONTAINING GAS

FIELD OF THE INVENTION

The present invention is a process for removing sulfur dioxide from a gaseous stream containing the same, such as a hot combustion gas stream, where a valuable by-product is also formed.

BACKGROUND OF THE INVENTION

Numerous wet scrubbing processes have been developed which are used to remove sulfur dioxide from gaseous streams. Particularly useful are processes which remove sulfur dioxide from hot combustion gas streams, such as gases resulting from the combustion of fossil fuels in power plants. Such removal is believed to alleviate the problem of acid rain which has had a negative effect on the environment and has become the subject of government regulation.

An example of a wet scrubbing system where magnesium components are used to remove sulfur dioxide from a gaseous stream is described in U.S. Pat. No. 5,039,499 to Donald H. Stowe, Jr., where a clear liquor scrubbing solution of magnesium components is used, where scrubber effluent is oxidized to produce gypsum as a by-product. U.S. Pat. No. 5,084,255, to John W. College and Lewis B. Benson, the inventors of the present process, also describes such a process, where a more readily dewatered sludge is formed, and a gypsum by-product recovered.

In such processes, increase in the rate and/or amount of dewatering of the sludge and any provision of a saleable by-product are desired in order to reduce the cost to the user of the desulfurization process.

It is an object of the present invention to provide a process for desulfurization of a sulfur dioxide-containing gas while producing a saleable by-product that can be used in a sulfuric acid/cement production facility.

It is another object of the present invention to produce a more readily dewatered sludge from a magnesium-based wet scrubbing system for removing sulfur dioxide from a gaseous stream.

SUMMARY OF THE INVENTION

A process for desulfurizing a sulfur dioxide-containing gas is provided where a more readily dewatered effluent is provided and where a calcium-silica product is produced that can be used in a cement/sulfuric acid production plant.

A sulfur dioxide-containing gas is contacted with a clear aqueous scrubbing solution, containing magnesium sulfite and magnesium bisulfite, in a wet scrubbing unit. Reaction between the magnesium sulfite and the sulfur dioxide produces additional magnesium bisulfite which remains in solution in the aqueous scrubbing solution. A portion of the solution, a clear liquor scrubbing medium, containing magnesium sulfite and magnesium bisulfite, at a pH of between 4.5–6.0, is discharged from the wet scrubbing unit and passed to a reaction tank. The solution in the reaction tank has added thereto a silica-containing solid particulate material, such as sand, and an aqueous lime slurry, in an amount sufficient to raise the pH to about 6.0 to 7.0. The lime reacts with magnesium bisulfite in the solution to form magnesium sulfite and calcium sulfite, the latter precipitating from the solution as solid crystals. At least a major portion of the calcium sulfite precipitate adheres as a coating on the silica-containing solid particulate material, while the magnesium sulfite remains in solution in the aqueous medium. The calcium sulfite coated, silica-containing solid particulate material is removed from the reaction tank and passed to a thickener, where the calcium sulfite coated, silica-containing solid particulate material is separated. The resultant aqueous solution, containing magnesium sulfite, after separation from the calcium sulfite coated, silica-containing solid particulate material and any residual calcium sulfite, is returned to the wet scrubbing unit for use in removal of further sulfur dioxide from a gas containing the same. Even in those instances where a cement manufacturing starting product is not desired, the present process is advantageous in that the settling and dewatering of the calcium sulfite produced is greatly aided by the new crystal growth practice, such that much larger particles are produced which settle extremely fast and dewater up to about 80 percent solids.

BRIEF DESCRIPTION OF THE DRAWING

The drawing is a schematic illustration of a preferred embodiment of the present process for removing sulfur dioxide from a sulfur dioxide-containing gas.

DETAILED DESCRIPTION

In the present method, a sulfur dioxide-containing gas, such as a hot flue gas from the combustion of coal, is contacted, in a wet scrubbing unit, with an aqueous scrubbing solution containing magnesium sulfite and magnesium bisulfite. The initial aqueous scrubbing solution may be prepared by addition of magnesium hydroxide to water and, upon contact with the sulfur dioxide-containing gas, magnesium bisulfite and magnesium sulfite are formed as soluble magnesium salts. The magnesium sulfite reacts with sulfur dioxide to form magnesium bisulfite in aqueous solution according to the reactions:

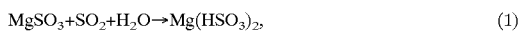
$$MgSO_3 + SO_2 + H_2O \rightarrow Mg(HSO_3)_2, \qquad (1)$$

and

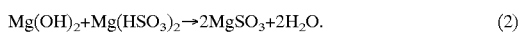
$$Mg(OH)_2 + Mg(HSO_3)_2 \rightarrow 2MgSO_3 + 2H_2O. \qquad (2)$$

Such a reaction sequence is effected, for example, by the wet scrubbing step described in U.S. Pat. No. 5,039,499, and U.S. Pat. No. 5,084,255, both of which are assigned to the assignee of the present invention, and the contents of both of which patents are incorporated by reference herein. In such processes, a clear scrubbing solution is used in the wet scrubbing unit. If the process is to be used to remove sulfur dioxide from flue gases resulting from coal fired boilers of power plants, or other combustion gas containing fly ash, the fly ash is removed from the gas stream and collected for use or disposal prior to passage of the sulfur dioxide-containing gas stream to the wet scrubbing unit for contact with the clear liquor aqueous scrubbing solution containing magnesium sulfite.

The magnesium bisulfite formed in the wet scrubbing unit is dissolved in the aqueous scrubbing solution. While recycle of aqueous scrubbing solution is carried out, a bleed stream or portion of the aqueous scrubbing solution, containing magnesium sulfite and magnesium bisulfite, is discharged, at a pH of between about 4.5 to 6.0, from the wet scrubbing unit. In accordance with the present invention, the discharged solution is passed to a reaction tank. To the solution in the reaction tank, which contains magnesium sulfite and magnesium bisulfite in solution, there is added a silica-containing solid particulate material. The silica-containing solid particulate material acts as nucleation sites for precipitating calcium sulfite resulting from lime addition and is added in an amount so as to give a Ca:Si ratio of about 2–3 moles of calcium per mole of silica which will result in a by-product useful in cement manufacture. The silica-containing solid particulate material is preferably sand, but may be other silica-containing solid particulate materials, such as fly ash or the like. The particle size of the silica-containing solid particulate material should be between 100–500 mesh (U.S. Sieve), preferably 100–325 mesh and most preferably as +325 to 240 mesh, so as to best act as nucleation sites for the precipitating calcium sulfite solids. The silica-containing solid particulate material containing solution is preferably stirred while in the reaction tank. Lime, preferably containing 1.5 to 7 weight percent magnesium oxide, is added to the magnesium sulfite and magnesium bisulfite aqueous solution in an amount sufficient to raise the pH of the solution to about 6.0 to 7.0, which lime reacts with the magnesium bisulfite to form calcium sulfite and additional magnesium sulfite according to the reaction:

$$Mg(HSO_3)_2 + Ca(OH)_2 \rightarrow CaSO_3 + MgSO_3. \tag{3}$$

The calcium sulfite formed precipitates from the aqueous solution, while the magnesium sulfite remains in solution. Upon precipitation of the calcium sulfite, at least a major portion of the calcium sulfite adheres to the silica-containing solid particulate material as a coating thereon, while the remainder of the precipitated calcium sulfite provides a resultant aqueous solution of magnesium sulfite containing a residual calcium sulfite precipitate. In the reaction tank or crystallizer, the relative saturation of calcium sulfite is controlled by the addition of the desired amount of silica-containing solid particulate material and surface area thereof which determine the rate of crystal growth and thus controls the relative saturation of calcium sulfite in the aqueous medium.

The calcium sulfite coated, silica-containing solid particulate material is then removed from the reaction tank and provides a source of feed material ($CaSO_3$ coated $SiO_2$ particles where sand is used) for a cement/sulfuric acid plant.

The calcium sulfite coated, silica-containing solid particulate material is removed from the reaction tank and is fed to a solids separator, such as a thickening unit, where the calcium sulfite coated, silica-containing solid particulate material and residual calcium sulfite precipitate are easily dewatered and removed from the remaining solution, while the remaining solution of magnesium sulfite is returned to the wet scrubbing unit for use in further desulfurization of a sulfur dioxide-containing gas.

Referring now to the drawing which schematically illustrates the present process, a wet scrubbing unit 1 is provided to which a sulfur dioxide-containing gas is fed through line 2 and clean gas discharged therefrom through line 3. A hold or recycle tank 4 is associated with the wet scrubbing unit 1 to which an initial aqueous solution containing magnesium hydroxide is charged through line 5. The aqueous scrubbing solution is recycled through line 6, pump 7 and line 8 to liquid charging devices 9 into the wet scrubbing unit 1 and flows counter current to the flow of sulfur dioxide-containing gas. The magnesium hydroxide, by reaction with sulfur dioxide, forms magnesium sulfite and the magnesium sulfite reacts with sulfur dioxide to form dissolved magnesium bisulfite. A portion of the reacted solution, at a pH of between about 4.5–6.0, containing magnesium bisulfite and magnesium sulfite is removed, such as through line 10 and passed to a reaction tank 11 preferably equipped with a stirring mechanism 12. A silica-containing solid particulate material, such as sand, is charged to the solution in the reaction tank 11 through line 13 from a source 14, while an aqueous lime slurry is also added to the solution in the reaction tank 11, to increase the pH of the solution to between 1–1.5 units of pH above the pH of the solution upon addition to the reaction tank. For example, if the solution upon addition to the reaction tank 11 is at a pH of 4.5, the lime would be added in an amount to increase the pH to 6.0 or above. The final pH should however be between 6.0 to 7.0 by addition of lime slurry through line 15 from a source 16. In the event that sulfur is added to the lime to form polysulfides so as to provide thiosulfate ions in the aqueous scrubbing solution, such as described in U.S. Pat. No. 4,976,937 the contents of which are incorporated herein, such can be added to the aqueous lime slurry source through line 17.

In the reaction tank 11, the lime reacts with the dissolved magnesium sulfite and forms a precipitate of calcium sulfite, at least a major portion of the precipitate adhering as a coating to the silica-containing solid particulate material. The calcium sulfite coated, silica-containing solid particulate material, residual calcium sulfite and aqueous medium containing dissolved magnesium sulfite is removed from the reaction tank 11 through line 18 and passed to a solids separator 19. The aqueous medium, or clarified liquor, containing magnesium sulfite, after separation from the calcium sulfite coated silica-containing solid particulate material and residual calcium sulfite, and at a pH of about 6.0 to 7.0, is removed from the solids separator 19 through line 20 and returned to the wet scrubbing unit 1 such as by addition to line 8, or to the recycle tank 4.

The calcium sulfite coated, silica-containing solid particulate material and residual calcium sulfite are removed from the solids separator 19 through line 21 and passed to a collection vessel 22. In the solids separator 19, dewatering of the calcium sulfite coated, silica-containing solid particulate material and residual calcium sulfite is effected at a higher settling rate to a value of about 64 percent solids by weight, which is for above the conventional dewatering of calcium sulfite products from desulfurization systems which are generally at a range of only about 20–35 percent solids by weight. Further dewatering on a belt filter or similar separating device should achieve a value of about 60–85% solids.

It is known that calcium sulfites and calcium sulfates can be used in cement manufacture with silica-containing material added. For example, heating of calcium sulfite and calcium sulfate produces CaO and $SO_2$ according to the reactions:

$$CaSO_3 + heat \rightarrow CaO + SO_2$$

$$CaSO_4 + C + heat \rightarrow CaO + CO + SO_2$$

The $SO_2$ produced can be used in sulfuric acid production, while the CaO can be used in cement production if silica is present according to the reactions:

$$CaO + SiO_2 \rightarrow CaSiO_3$$

$$2CaO + SiO_2 \rightarrow Ca_2SiO_4$$

$$3CaO + SiO_2 \rightarrow Ca_3SiO_2$$

In the present process, the calcium sulfite coated silica-containing solid particulate material provides both $CaSO_3$ and $SiO_2$ for use in sulfuric acid and cement manufacture.

What is claimed is:

1. A process for desulfurization of a sulfur dioxide-containing gas comprising:

contacting said sulfur dioxide-containing gag in a wet scrubbing unit, with an aqueous scrubbing solution containing magnesium sulfite and magnesium bisulfite, which magnesium sulfite reacts with the sulfur dioxide to form additional dissolved magnesium bisulfite;

discharging a portion of said reacted solution, at a pH of between about 4.5 to 6.0 and containing dissolved magnesium sulfite and magnesium bisulfite, from said wet scrubbing unit;

passing the discharged solution to a reaction tank;

charging a silica-containing solid particulate material selected from the group consisting of sand and fly ash to said discharged solution in said reaction tank;

adding an aqueous slurry comprising lime to said discharged solution in said reaction tank so as to raise the pH of said solution to at least 6.0 to 7.0, wherein a calcium sulfite precipitate is formed by reaction of said lime with said dissolved magnesium bisulfite and at least a major portion of the precipitated calcium sulfite adheres to said silica-containing solid particulate material to form a calcium sulfite coated, silica-containing solid particulate material;

removing said calcium sulfite coated, silica-containing solid particulate material, residual calcium sulfite and resultant aqueous medium containing magnesium sulfite from said reaction tank;

separating said calcium sulfite coated, silica-containing solid particulate material and residual calcium sulfite from said aqueous medium; and returning said aqueous medium containing magnesium sulfite free of silica-containing solid particulate material to said wet scrubbing unit to maintain the wet scrubbing unit free of silica-containing solid particulate material.

2. The process for desulfurization of a sulfur dioxide-containing gas as defined in claim 1 wherein said silica-containing solid particulate material has a particle size between 100–500 mesh.

3. The process for desulfurization of a sulfur dioxide-containing gas as defined in claim 2 wherein said silica-containing solid particulate material has a particle size between 325 to 240 mesh.

4. The process for desulfurization of a sulfur dioxide-containing gas as defined in claim 1 wherein said aqueous slurry comprising lime contains about 1.5 to 7 weight percent magnesium oxide.

5. The process for desulfurization of a sulfur dioxide-containing gas as defined in claim 1 wherein said aqueous scrubbing solution contains thiosulfate ions in an amount sufficient to inhibit oxidation of magnesium sulfite to magnesium sulfate in said wet scrubbing unit.

6. The process for desulfurization of a sulfur dioxide-containing gas as defined in claim 1 wherein said aqueous slurry comprising lime is added to said solution in an amount to increase the pH of the solution to between 1–1.5 units of pH.

7. The process for desulfurization of a sulfur dioxide-containing gas as defined in claim 1 wherein said separated calcium sulfite coated, silica-containing solid particulate material and residual calcium sulfite are dewatered to achieve a value of 60–85 percent solids.

* * * * *